(12) United States Patent
Baehrle-Miller et al.

(10) Patent No.: US 12,157,442 B2
(45) Date of Patent: Dec. 3, 2024

(54) DRIVETRAIN FOR A VEHICLE

(71) Applicant: Robert Bosch GmbH, Stuttgart (DE)

(72) Inventors: Frank Baehrle-Miller, Schoenaich (DE); Hubertus Wienken, Langenbrettach (DE)

(73) Assignee: Robert Bosch GmbH, Stuttgart (DE)

( * ) Notice: Subject to any disclaimer, the term of this patent is extended or adjusted under 35 U.S.C. 154(b) by 1027 days.

(21) Appl. No.: 16/445,643

(22) Filed: Jun. 19, 2019

(65) Prior Publication Data

US 2019/0389437 A1  Dec. 26, 2019

(30) Foreign Application Priority Data

Jun. 20, 2018  (DE) ..................... 10 2018 210 004.7

(51) Int. Cl.
*B60T 1/06* (2006.01)
*F16D 49/08* (2006.01)
*F16D 65/16* (2006.01)

(52) U.S. Cl.
CPC .............. *B60T 1/062* (2013.01); *F16D 49/08* (2013.01); *F16D 65/16* (2013.01); *B60Y 2400/424* (2013.01)

(58) Field of Classification Search
CPC .......... B60T 1/062; F16D 49/08; F16D 65/16; B60Y 2400/424
See application file for complete search history.

(56) References Cited

U.S. PATENT DOCUMENTS

| | | | | |
|---|---|---|---|---|
| 2,426,365 A | * | 8/1947 | Dayton ................... | B60T 1/062 192/220.4 |
| 4,456,100 A | * | 6/1984 | Manaki ................... | F16D 49/06 188/249 |
| 5,947,866 A | * | 9/1999 | Nagashima ............. | F16D 67/02 477/200 |
| 7,913,816 B2 | * | 3/2011 | Shimizu .............. | F16H 57/0434 184/6.12 |
| 8,857,272 B2 | * | 10/2014 | Goetting ............. | B60L 15/2054 73/862.321 |
| 10,543,822 B2 | * | 1/2020 | Morandi ............. | B60W 10/196 |
| 2016/0096513 A1 | * | 4/2016 | Alasmari ................ | B60T 17/18 188/2 D |

FOREIGN PATENT DOCUMENTS

| | | | | |
|---|---|---|---|---|
| DE | 1 920 509 A | | 11/1970 | |
| DE | 10 2005 045 004 A1 | | 3/2007 | |
| DE | 102009022475 A1 | * | 12/2009 | ............. B60T 1/062 |
| DE | 102009018828 A1 | * | 11/2010 | ............. F16D 49/02 |
| WO | WO-2017050885 A1 | * | 3/2017 | .......... B60W 10/196 |

* cited by examiner

*Primary Examiner* — Xuan Lan Nguyen
(74) *Attorney, Agent, or Firm* — Maginot, Moore & Beck LLP

(57) ABSTRACT

A drivetrain for a vehicle includes a drive motor, an axle differential, and a friction brake. The drive motor is configured to drive the axle differential. The friction brake is positioned in a transmission path between the drive motor and the axle differential, and is configured to generate a braking torque.

16 Claims, 3 Drawing Sheets

DRIVETRAIN FOR A VEHICLE

This application claims priority under 35 U.S.C. § 119 to patent application no. DE 10 2018 210 004.7, filed on Jun. 20, 2018 in Germany, the disclosure of which is incorporated herein by reference in its entirety.

The disclosure relates to a drivetrain for a vehicle.

BACKGROUND

Vehicles are known, the drivetrain of which have an internal combustion engine and an automatic transmission, the output shaft of which have an axle differential for distribution of the driving torques to the left and right wheel of the axle, on which the axle differential is arranged. In order to realize a parking brake via which the vehicle is fixed at a standstill, the automatic transmission is provided with a pawl which, as is structurally required, is only adjustable in a low speed range into a locking position in which a movement of the automatic transmission is mechanically blocked. Above a speed threshold, the pawl can, however, on the grounds of safety not be moved into its locking position in order to prevent unintentional blocking of one or both driven wheels.

In the case of vehicles which are equipped with a manual transmission in the drivetrain, the drivetrain can be blocked by the manual engagement of a gear.

In the case of electric vehicles, the drive motor of which is an electric motor, in the event that a transmission is arranged downstream of the electric motor, this can also be blocked via a pawl. In the case of electric vehicles without transmissions, independent parking brakes must be installed, which results in a significant additional outlay.

SUMMARY

The drivetrain according to the disclosure which serves in vehicles to drive at least two wheels on a common axle comprises a drive motor and an axle differential which sits on the driven axle of the vehicle and distributes driving torques of the drive motor to wheels on the left and right on the axle. The axle differential ensures rotational speed equalization between the wheels of the axle during cornering.

The drivetrain additionally comprises a friction brake which is arranged in the transmission path between the drive motor and the axle differential. An adjustable friction force or braking torque can be generated in the drivetrain via the friction brake. The friction brake thus makes it possible to apply a braking torque on the input side of the axle differential, which braking torque acts via the axle differential on the wheels of the axle. Vice versa, driving torques which proceed from the wheels can be absorbed, for example, in the case of a vehicle parked on a slope, via the axle differential by the friction brake. It is thus possible to use the friction brake as a parking brake in the vehicle. In a preferred embodiment, the friction brake is the only parking brake in the vehicle so that no further parking brake is furthermore required.

The level of braking torque in the friction brake can be set between the value zero and a maximum value. According to one preferred embodiment, it is possible to set the level of the braking torque generated by friction in a changeable manner. In an alternative embodiment, it is also possible to set the braking torque only to defined, discrete values, where applicable, to only enable a single braking value greater than zero.

According to a further advantageous embodiment, a transmission is arranged between the drive motor and the axle differential. The transmission is arranged downstream of the drive motor and ensures a rotational speed step-up or rotational speed step-down or possibly also identical rotational speed transmission of the drive motor. The friction brake is located either between the drive motor and the transmission or between the transmission and the axle differential. In both cases, the friction brake is upstream of the axle differential in the active chain, proceeding from the drive motor. In both cases, it is possible to make available a sufficiently high braking torque generated by friction in the friction brake for fixing the vehicle at a standstill in particular to realize the parking brake function.

The friction brake makes it possible to do without a pawl for mechanical locking of the transmission. The transmission is not structurally influenced by the friction brake. A braking torque is only provided on the input or output side of the transmission depending on the position of the friction brake in relation to the transmission. A mechanical engagement does not, however, take place as in the case of a pawl.

In a preferred embodiment, the friction brake is used as a parking brake. Alternatively or additionally, it is also possible to use the friction brake as a vehicle brake via which the vehicle can be braked even at higher speeds.

The friction brake between drive motor and axle differential also enables a simpler design of the regular vehicle brake. It is not necessary to integrate an additional parking brake in the vehicle brake. If the friction brake is used in addition to the vehicle brake to brake the vehicle from higher speeds, the regular vehicle brake can, where applicable, have smaller dimensions.

The drivetrain can have an electric motor as the drive motor. In this case, where applicable, a transmission, which is arranged downstream of the electric motor, can be omitted so that the adjustable friction brake lies between the electric motor as a drive motor and the axle differential without interpositioning of a transmission upstream or downstream of the friction brake. In an alternative embodiment, it is, however, also possible to arrange a transmission downstream of the electric motor as a drive motor, wherein the friction brake is arranged either upstream or downstream of the transmission in relation to the active chain from the drive motor to the driven wheels.

Alternatively to an electric motor, it is also possible to use an internal combustion engine as the drive motor. In any case, a transmission is arranged downstream of the internal combustion engine, wherein the friction brake is, as described above, arranged either upstream or downstream of the transmission.

Hybrid drive forms are furthermore also considered, in particular a combination of internal combustion engine and electric motor which act in each case as a drive motor and can be actuated either jointly or individually in order to generate driving torque. The friction brake is located in front of or behind a transmission which is arranged downstream of the internal combustion engine.

It can, where applicable, be expedient to integrate the friction brake into the transmission housing of the transmission so that the transmission and the friction brake form a joint structural unit. In an alternative embodiment, it is also possible that the friction brake has a separate friction brake housing which is integrated at a suitable position into the drivetrain between drive motor and axle differential. This embodiment has the advantage that the friction brake is embodied as an independent structural unit which is formed independently of the further structural units in the drivetrain so that no adjustments are necessary for the friction brake in these further structural units, for example, the transmission.

According to a yet further embodiment, the friction brake is to be adjusted between a functional position, in which the friction brake enables a maximum friction force, and a reduction position in which either no or only a reduced maximum friction force can be generated in the friction brake. As a result of this, it should in particular be ensured that a high braking torque is not accidentally generated in the friction brake in the case of higher speeds. It can be advantageous that, above a speed threshold of, for example, 3 km/h, the friction brake is in the reduction position and can generate no friction force or possibly only a reduced maximum friction force.

Below the speed threshold value, the friction brake is, however, in the functional position in which the generation of the maximum friction force is possible.

Adjustment of the friction brake between the functional position and the reduction position is carried out, according to a further advantageous embodiment, via an actuation unit which is either formed passively, for example, as a centrifugal element, or actively, for example, as an actuator.

The actuation of the actuator can be carried out automatically or manually. Automatic triggering of the actuator is carried out in particular as a function of a driving status variable, preferably the driving speed, so that, for example, with the overshooting of the specified speed threshold value, the friction brake is adjusted by automatic triggering of the actuator from the functional into the reduction position and with the undershooting of the speed threshold value from the reduction into the functional position.

Alternatively to an actuator, it is also possible to configure the friction brake in a passive manner so that in particular with the overshooting or undershooting of the speed threshold value the friction brake is adjusted between the functional and reduction position. This can be carried out, for example, by centrifugal force so that the friction brake can be adjusted in a centrifugal force-dependent manner between the functional and reduction position.

According to a yet further advantageous embodiment, the level of the friction force which is generated by the friction brake can be adjusted either manually or with the aid of an actuator.

This relates to both the embodiments in which the friction brake can only be adjusted between zero and precisely one maximum braking torque, in particular for fixing the vehicle at a standstill, and embodiments with any desired adjustment possibilities of the braking torque between zero and a maximum braking torque. The actuator for adjustment of the braking torque can be controlled either manually or as a function of a driving status variable and/or a parameter of the vehicle. It is, for example, possible, in the case of a stationary vehicle and simultaneously in the case of a drive motor which is switched off, to generate a maximum braking torque via the actuation of the actuator in order to realize the parking brake function in the friction brake.

The disclosure furthermore relates to a vehicle, in particular a motor vehicle, which is equipped with a drivetrain described above. The motor vehicle can be provided with one or more driven axles. In the case of several driven axles, either one drivetrain is present for each axle or a joint drivetrain is present for several driven axles. It is possible in the case of several driven axles which have either one joint drivetrain or vehicle wheels driven via in each case one drivetrain to arrange an adjustable friction brake either only on one axle or on all the axles in each case in front of the axle differential.

According to a further advantageous embodiment, the friction brake is arranged in the drivetrain of the vehicle in addition to the wheel brakes. The friction brake thus does not replace the wheel brakes, rather serves either only as a parking brake or supplements the wheel brakes.

It is alternatively also possible that the friction brake—in the case of corresponding dimensioning—replaces a part of the wheel brake or all the wheel brakes.

The friction brake can be embodied in a manner which is known per se and have, for example, a brake drum which is connected to a shaft and around which a brake band is wound which is acted upon with a friction force around the brake drum in order to generate braking torque. The shaft is a connecting shaft between two units of the drivetrain, for example the shaft between drive motor and transmission or the shaft between transmission and axle differential.

In a further embodiment, the friction brake is arranged between the axle differential and a driven vehicle wheel. It can be expedient to arrange in each case a friction brake between the axle differential and each driven vehicle wheel.

BRIEF DESCRIPTION OF THE DRAWINGS

Further advantages and expedient embodiments can be inferred from the further claims, the description of the figures and the drawings. In the drawings:

DETAILED DESCRIPTION

Identical components are provided with identical reference numbers in the figures.

Figure 1:
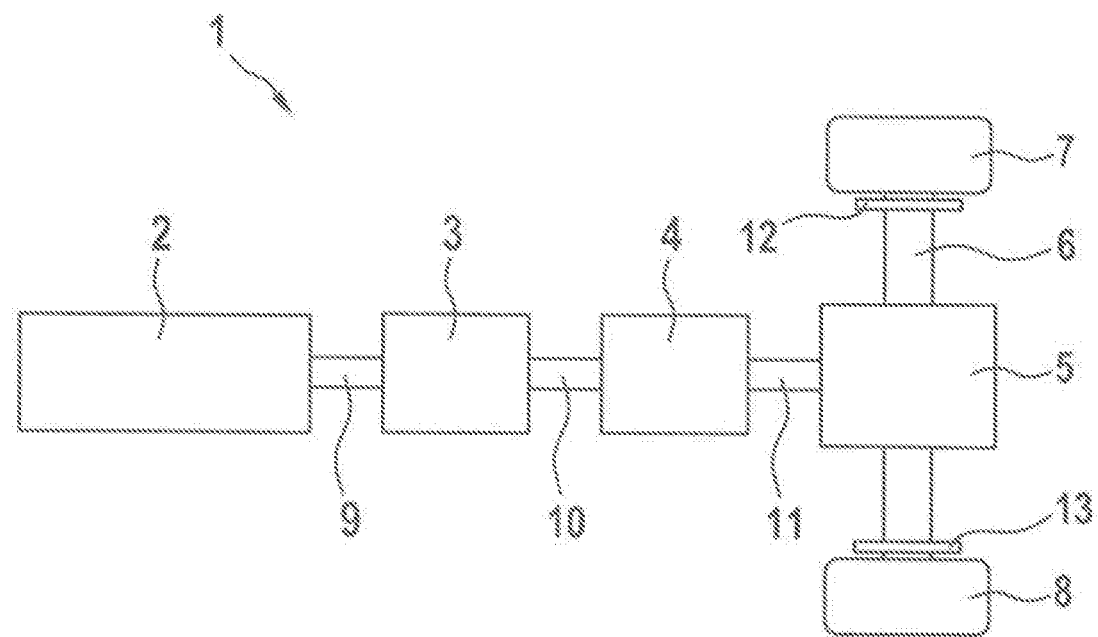
FIG. 1 shows a schematic representation of a drivetrain in a vehicle with a drive motor, a transmission, a friction brake and an axle differential on the axle with the driven wheels.

A drivetrain 1 for a motor vehicle is represented schematically in FIG. 1. Drivetrain 1 comprises a drive motor 2, a transmission 3, a friction brake 4 and an axle differential 5 which sits on a vehicle axle 6, which is a carrier of a left and right driven vehicle wheel 7 or 8.

Drive motor 2 drives transmission 3 via a shaft 9, which transmission 3 is connected via a further shaft 10 to the friction brake which is in turn connected via a further shaft 11 to axle differential 5. Shaft 9 forms the output shaft of drive motor 2 and at the same time the input shaft of transmission 3. Shaft 10 forms the output shaft of transmission 3 and at the same time the input shaft of friction brake 4. Shaft 11 forms the output shaft of friction brake 4 and at the same time the input shaft of axle differential 5.

Wheel brakes 12 and 13 sit on the vehicle wheels. This involves in particular a hydraulic vehicle brake.

Friction brake 4 can also, where applicable, be arranged between drive motor 2 and transmission 3.

Friction brake 4 primarily has the function of a parking brake in order to fix the vehicle permanently at a standstill.

To this end, friction brake 4 generates, at a standstill of the vehicle, a braking torque which counteracts any driving torque, which originates from vehicle wheels 7, 8, for example, as result of parking of the vehicle on a steep road. The braking torque is advantageously generated via friction brake 4 only at a standstill of the vehicle or in the case of a vehicle speed below a speed threshold value of, for example, 3 km/h. Where applicable, however, the braking torque in friction brake 4 can also be used at higher vehicle speeds in order to assist vehicle brake 12, 13.

Drive motor 2 is, for example, an internal combustion engine. Alternatively, an electric motor is also possible as drive motor 2. In the case of an electric motor, a transmission 3 can also be provided. In an alternative embodiment, in the case of an electric motor as drive motor 2, such a transmission 3 can be omitted. In this case, friction brake 4 sits directly between the electric motor as drive motor 2 and axle differential 5.

Figure 2:
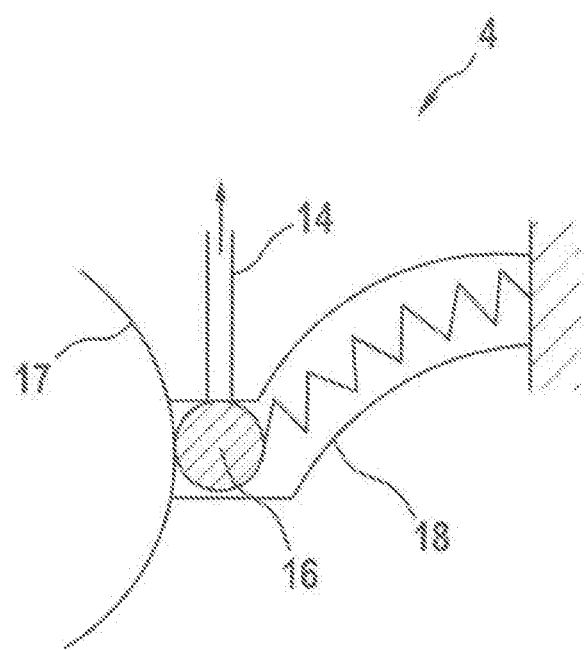
FIG. 2 shows a schematic diagram of an actuating apparatus of the friction brake which is located in the functional position in which a maximum braking torque can be generated.
Figure 3:
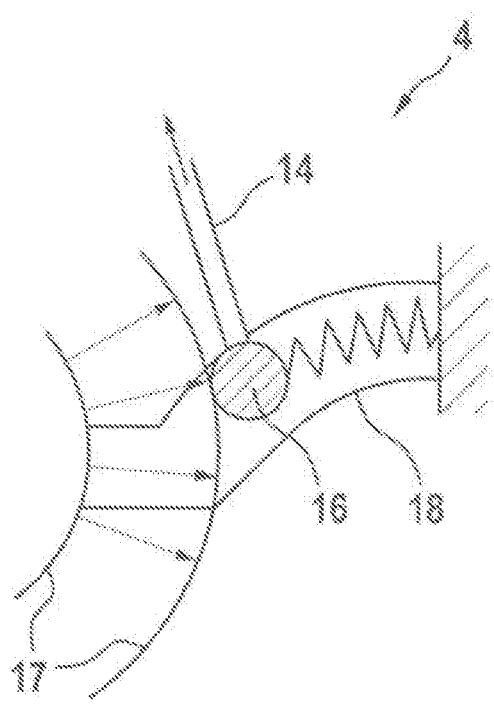
FIG. 3 shows a representation corresponding to FIG. 2 of the friction brake which is, however, located in a reduction position in which only a reduced braking torque can be generated.
Figure 4:
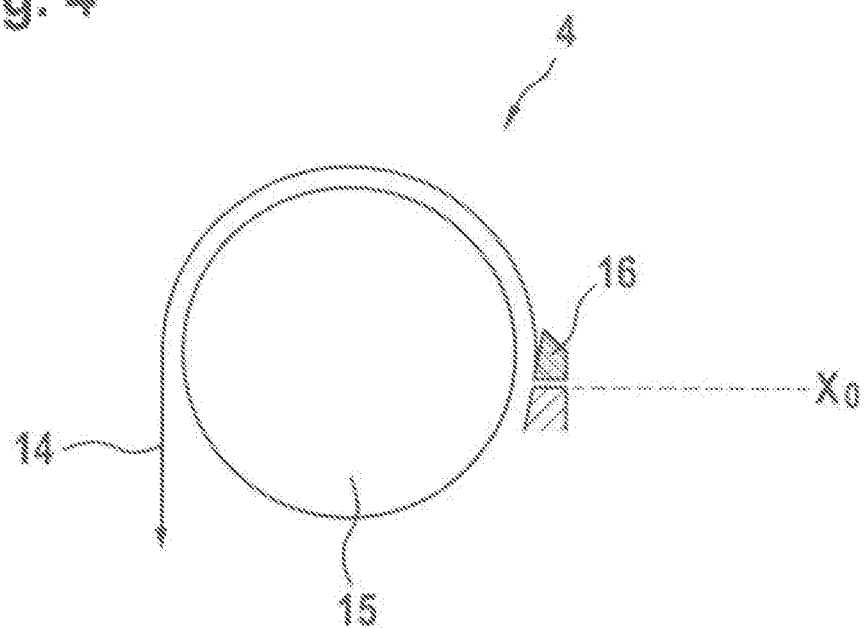
FIG. 4 shows a schematic diagram of the friction brake with a brake band which is wound around a brake drum, represented in the functional position.
Figure 5:
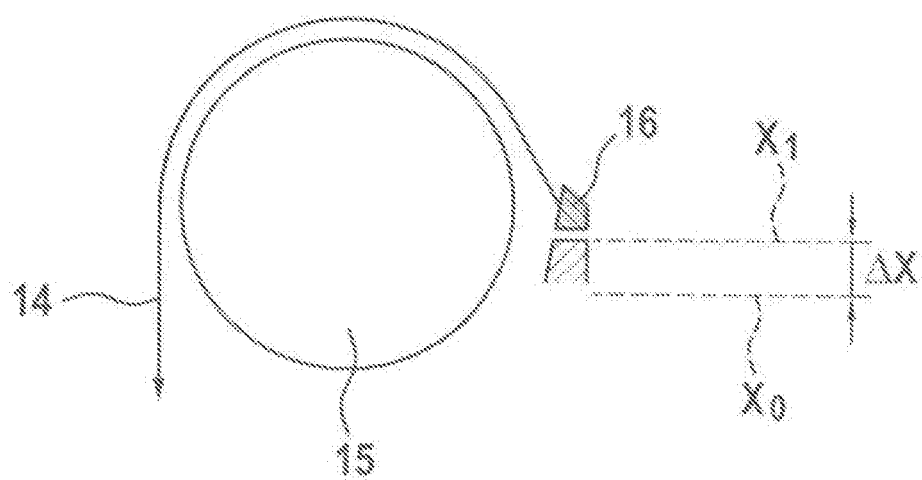
FIG. 5 shows a representation corresponding to FIG. 4 with the friction brake in the reduction position.

Friction brake 4 is to be adjusted between a functional position, which is represented in FIGS. 2 and 4, and a reduction position, which is represented in FIGS. 3 and 5. In the functional position according to FIGS. 2 and 4, where necessary, a maximum braking torque can be generated in friction brake 4, advantageously in continuous gradation between zero and the maximum braking torque. Either no braking torque or only a reduced braking torque can in contrast be generated in friction brake 4 in the reduction position according to FIGS. 3 and 5. In the event that friction brake 4 is used as a parking brake, friction brake 4 assumes the reduction position in all speeds above the threshold speed of, for example, 3 km/h. This means that the maximum braking torque which is generated for permanent fixing of the vehicle can only be generated if the vehicle speed lies below the threshold speed.

Adjustment between the functional position and the reduction position is carried out with the aid of an actuation unit 17 (FIGS. 2, 3) which is formed either passively, for example, as a centrifugal element, or actively, for example, as an actuator. Actuation unit 17 acts on a bearing 16 to which a brake band 14 is fastened which is placed around brake drum 15 as a component of friction brake 4 (FIGS. 4, 5). Brake drum 15 is connected fixedly to a shaft in the drivetrain so that a braking torque is generated in the drivetrain with the placing of brake band 14 on the outside of brake drum 15.

Bearing 16 holds brake band 14 in position. Bearing 16 is held adjustably, for example, in a guide 18, wherein actuation unit 17 adjusts bearing 16 in guide 18 between a starting position according to FIG. 2, which corresponds to the functional position, and a deflected position according to FIG. 3, which corresponds to the reduction position. As can be inferred from a comparison of FIGS. 4 and 5, bearing 16 is, in the event of a transfer from the functional position into the reduction position, raised from an initial level $x_0$ by the amount $\Delta x$ to a level $x_1$ so that, in the event of equal actuation of brake band 14, no friction force or at least a significantly lower friction force is generated between brake band 14 and brake drum 15 and thus a correspondingly lower braking torque is generated. With the transfer of bearing 16 from the reduction position according to FIG. 5 into the functional position according to FIG. 4, the maximum possible friction force and the maximum possible braking torque are available again.

What is claimed is:

1. A drivetrain for a vehicle, comprising:
an axle differential;
a drive motor configured to drive the axle differential; and
a friction brake positioned in a transmission path between the drive motor and the axle differential, and configured to generate an adjustable braking torque that acts within the drivetrain, wherein either:
(i) the drivetrain further comprises an actuator operable to adjust a maximum level of the braking torque generated by full actuation of the friction brake; or (ii) the friction brake is configured such that the maximum level of the braking torque generated by full actuation of the friction brake is manually adjustable.

2. The drivetrain of claim 1, further comprising:
a transmission positioned downstream of the drive motor, wherein the friction brake is positioned either upstream or downstream of the transmission.

3. The drivetrain of claim 1, wherein the drive motor is an electric motor.

4. The drivetrain of claim 1, wherein the drive motor is an internal combustion engine.

5. The drivetrain of claim 1, wherein the friction brake is adjustable between (i) a functional position that enables a maximum braking torque and (ii) a reduction position that enables a reduced braking torque or no braking torque.

6. The drivetrain of claim 5, further comprising the actuator, wherein:
the actuator is assigned to the friction brake for adjustment between the functional position and the reduced position.

7. The drivetrain of claim 1, wherein the friction brake is operable as a parking brake and is configured to fix the vehicle at a standstill.

8. The drivetrain of claim 1, wherein the friction brake includes a separate friction brake housing.

9. A vehicle, comprising:
a drivetrain, including:
an axle differential;
a drive motor configured to drive the axle differential; and
a friction brake positioned in a transmission path between the drive motor and the axle differential, and configured to generate an adjustable braking torque that acts within the drivetrain, wherein the friction brake is adjustable between (i) a functional position that enables a maximum braking torque upon actuation and (ii) a reduction position that enables a reduced braking torque or no braking torque upon actuation.

10. The vehicle of claim 9, further comprising:
wheel brakes positioned in the drivetrain in addition to the friction brake.

11. The vehicle of claim 9, the friction brake comprising:
a brake band movable between a first brake band position from which a first maximum braking torque of the adjustable braking torque is applied to a shaft of the transmission path upon actuation of the brake band, and a second brake band position from which a second maximum braking torque of the adjustable braking torque is applied to the shaft of the transmission path upon actuation of the brake band, wherein the first maximum braking torque is greater than the second maximum braking torque.

12. The vehicle of claim 11, further comprising:
a bearing movable between a first bearing position and a second bearing position, wherein positioning the bearing at the first bearing position positions the brake band at the first brake band position, and positioning the bearing at the second bearing position positions the brake band at the second brake band position.

13. The vehicle of claim 12, further comprising:
a guide configured to guide the bearing between the first bearing position and the second bearing position.

14. The drivetrain of claim 1, the friction brake comprising:
a brake band movable between a first brake band position from which a first maximum braking torque of the adjustable braking torque is applied to a shaft of the transmission path upon actuation of the brake band, and a second brake band position from which a second maximum braking torque of the adjustable braking torque is applied to the shaft of the transmission path upon actuation of the brake band, wherein the first maximum braking torque is greater than the second maximum braking torque.

15. The drivetrain of claim 14, further comprising:
a bearing movable between a first bearing position and a second bearing position, wherein positioning the bearing at the first bearing position positions the brake band at the first brake band position, and positioning the bearing at the second bearing position positions the brake band at the second brake band position.

16. The drivetrain of claim 15, further comprising:
a guide configured to guide the bearing between the first bearing position and the second bearing position.

* * * * *